United States Patent [19]

Maag

[11] Patent Number: 5,756,168

[45] Date of Patent: May 26, 1998

[54] LAMINATE ARTICLE AND METHOD FOR MAKING SAME

[76] Inventor: William D. Maag, 321 Erway Ct., Kingsport, Tenn. 37664

[21] Appl. No.: 770,764

[22] Filed: Dec. 19, 1996

Related U.S. Application Data

[60] Provisional application No. 60/012,646, Mar. 1, 1996.

[51] Int. Cl.$^6$ ...................................... B65D 85/00
[52] U.S. Cl. .................... 428/34.1; 428/122; 428/81; 428/121; 428/130; 428/192; 220/416; 220/613; 220/623; 220/356; 220/359; 156/73.1
[58] Field of Search ................ 428/34.1, 81, 121, 428/122, 130, 192; 220/416, 613, 623, 356, 359; 156/73.1

[56] References Cited

U.S. PATENT DOCUMENTS

| 4,241,121 | 12/1980 | O'Connor | 428/77 |
| 4,430,288 | 2/1984 | Bonis | 264/510 |
| 4,876,125 | 10/1989 | Akao et al. | 428/35.2 |
| 5,055,152 | 10/1991 | Inagaki | 156/244.11 |

*Primary Examiner*—Charles Nold
*Attorney, Agent, or Firm*—Betty J. Boshears; Harry J. Gwinnell

[57] ABSTRACT

The present invention relates to a laminate article formed of multiple incompatible polymer plies. The laminate article has a flange construction which limits delamination in areas of the article heretofore prone to delaminate and thus provides improved structural integrity, longevity and appearance and a longer useful life in a range of applications.

25 Claims, 6 Drawing Sheets

5,756,168

LAMINATE ARTICLE AND METHOD FOR MAKING SAME

This is an ORIGINAL application based on the PROVISIONAL Serial No. 60/012,646 filed Mar. 1, 1996, abandoned.

FIELD OF THE INVENTION

The present invention relates to a laminate article formed of multiple incompatible polymer plies and a method for making such article.

BACKGROUND OF THE INVENTION

Multilayered sheet is commonly used to prepare articles in order to impart favorable properties of individual layers to the article as a whole. It is often desirable to employ as the individual layers or plies polymers which are not compatible but which offer structural or functional advantages when combined in superimposed relation in a multi-ply arrangement. However, laminates comprising multiple layers of incompatible polymers tend to delaminate, deform or curl, during or after being subjected to a thermoforming operation.

In an effort to limit deformation or delamination, multilayer sheet containing incompatible polymers is often extruded with an adhesive or tie layer between the incompatible layers of polymer and subsequently thermoformed. For example, U.S. Pat. No. 4,430,288 describes a method for making a multilayer sheet from a polyester and a polyolefin, which are generally incompatible. The method involves using an adhesive tie layer between the polyester layer and polyolefin layer. The multilayer article prepared therefrom is said to exhibit resistance to curling.

U.S. Pat. No. 5,055,152 describes a method for making an easily separable laminated/perforated film for packing without the use of an adhesive or tie layer between the layers of incompatible polymers. The method involves pressing a plastic film which is in a fused state into the perforations of a plastic perforated film, thus forming a mechanical bond.

Despite these and other advances, multilayer sheet of incompatible polymer layers, when subjected to thermoforming, continues to exhibit delamination and deformation in certain situations and with certain polymer laminate constructions. These include situations where the thermoforming is undertaken to shape an article with very tight, intricate curves or bends and/or where relatively thick layers of incompatible polymer are used. Delamination is particularly troublesome in perimeter or edge areas of such laminates, and may be more pronounced following thermoforming operations.

SUMMARY OF THE INVENTION

Accordingly, it is an object of this invention to provide a thermoformable laminate article which exhibits good structural properties.

It is another object of the invention to provide a laminate article of the character described which is economical to manufacture.

A further object of the invention is to provide a laminate article of the character described which is prepared from incompatible polymer layers.

An additional object of the invention is to provide a laminate and a method of making a laminate of incompatible polymers which is thermoformable into intricate shapes and which resists delamination or deformation in such shapes.

With regard to the foregoing and other objects, the present invention provides a laminate article which comprises a continuous multi-ply construction of two or more superposed incompatible polymeric plies laminated together in the absence of a tie layer having a central relatively wide and flat pan section, an upstanding side wall extending therefrom and a flange on the sidewall, the flange having a first section extending from the sidewall and a second section extending from the first section at least a portion of the second section is folded against the first section and heat sealed thereto.

According to one aspect of the invention, the second section of the flange may include first and second portions wherein the first portion extends from the first section of the flange to provide a pocket between the sidewall and the first portion, the second portion extending from the first portion and being folded against the first portion in the pocket between the first portion and the sidewall so that the second portion is sandwiched in the pocket between the first portion of the second section of the flange and the sidewall and heat sealed to the sidewall and first portion. According to this aspect of the invention, the second portion of the second section of the flange may have an end terminating the flange, wherein the end is heat sealed to the first section of the flange so that the second portion fills the pocket and is substantially completely heat sealed therein to all adjacent surfaces.

In another aspect of the invention, the second section of the flange includes first, second, and third portions, the first portion extending from the first section of the flange, the second portion extending from first portion substantially perpendicular to the first section of the flange in spaced-apart relation thereto defining a pocket therebetween and the third portion extending from the second portion into the pocket and being folded against the second portion and heat sealed to the first section of the flange and the second portion of the second section. The second and third portions of the second section of the flange are preferably spaced from the sidewall so as to define a second pocket located between the sidewall and the second section of the flange closed on the bottom by the first section of the flange.

The present invention is also directed to a method for making a laminate article comprising:

I. coextruding a laminate sheet having multiple plies of substantially continuous incompatible polymers without a tie layer therebetween;

II. molding the laminate sheet at a temperature and pressure sufficient to form the sheet into an article having a relatively wide, flat pan section, an upstanding sidewall extending from the pan section and a flange extending from the sidewall, the flange having a first section extending from the sidewall and a second section extending from the first section; and III. folding at least a portion of the second section of the flange against the first section of the flange under sufficient heat and pressure to cause the second section to heat seal with the first section of the flange.

In one embodiment, the laminate article comprises a copolyester outer layer, a copolyester backing layer and an incompatible polymer layer sandwiched between the outer layer wherein the polyester has an inherent viscosity of about 0.4 to about 1.5 dl/g.

The heat sealed portions of the flange contribute to significantly improved resistance to delamination, curling, buckling or deformation of the thermoformed article. The flange construction therefore limits delamination in areas of the article heretofore prone to delaminate and thus provides improved structural integrity, longevity and appearance and a longer useful life in a range of applications.

BRIEF DESCRIPTION OF THE DRAWINGS

The above and other features of the invention will be further described in the following detailed specification considered in conjunction with the accompanying drawings in which.

DESCRIPTION OF THE INVENTION

Figure 1:
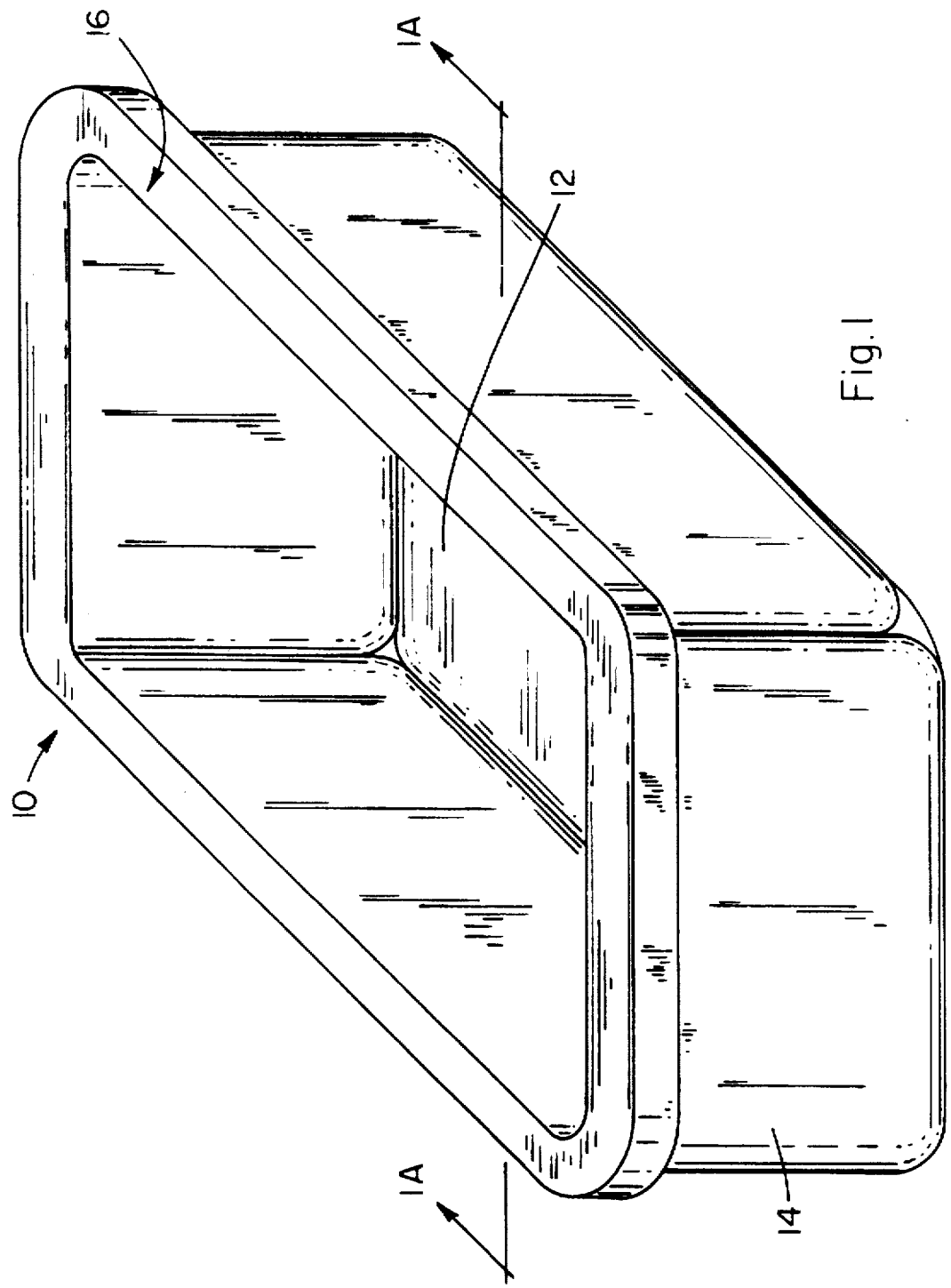
FIGS. 1 and 1a are perspective and cross-sectional views, respectively, of an article comprising multiple incompatible polymer layers thermoformed into a tray configuration illustrating aspects of a preferred embodiment of the invention.
Figure 1A:
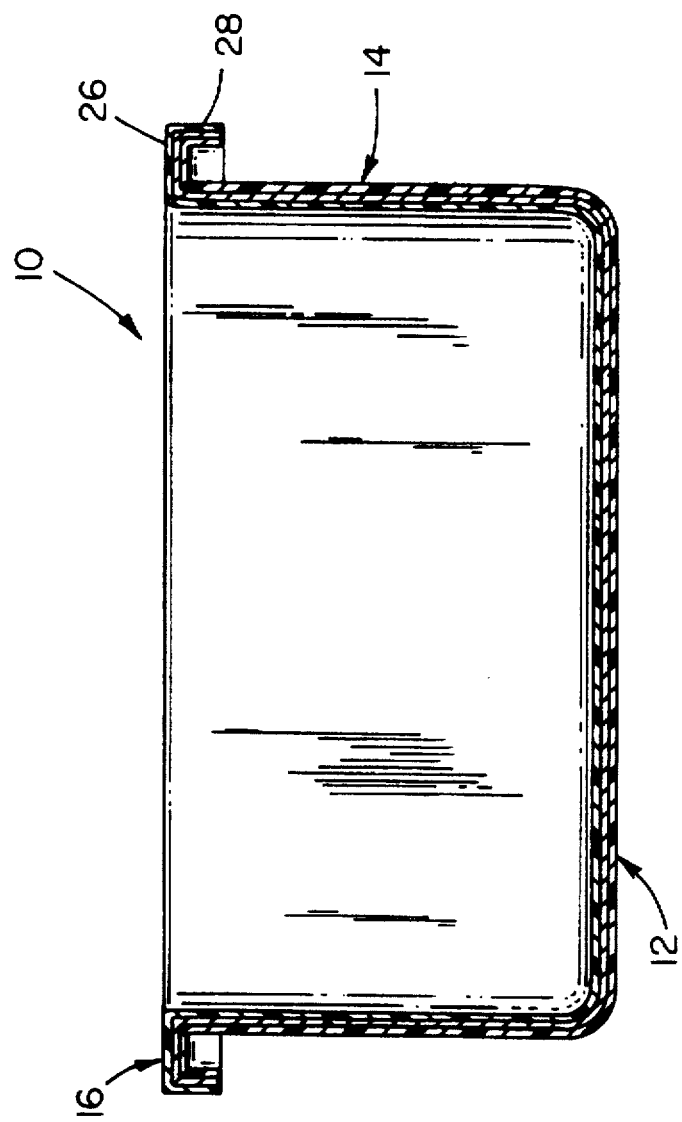

With initial reference to FIGS. 1 and 1a, a thermoformed laminate article according to the illustrated embodiment of the invention is prepared from a laminate sheet having a plurality of layers or plies of incompatible polymers configured as a container or tray 10 having a relatively wide, flat bottom or pan 12 and a surrounding sidewall 14 with an outwardly projecting flange 16. As used herein, "flat" is intended only to refer to the generally planar configuration of pan 12, the surface of which may be provided with a wide range of shapes and forms including, but not limited to, raised lands or striations and any pattern or arrangement of undulations, ribs, channels, islands, partitions, sections, walls or the like such as may be imposed by molding with appropriate dies, all of which fall under the general definition of "flat" as used herein.

Figure 2:
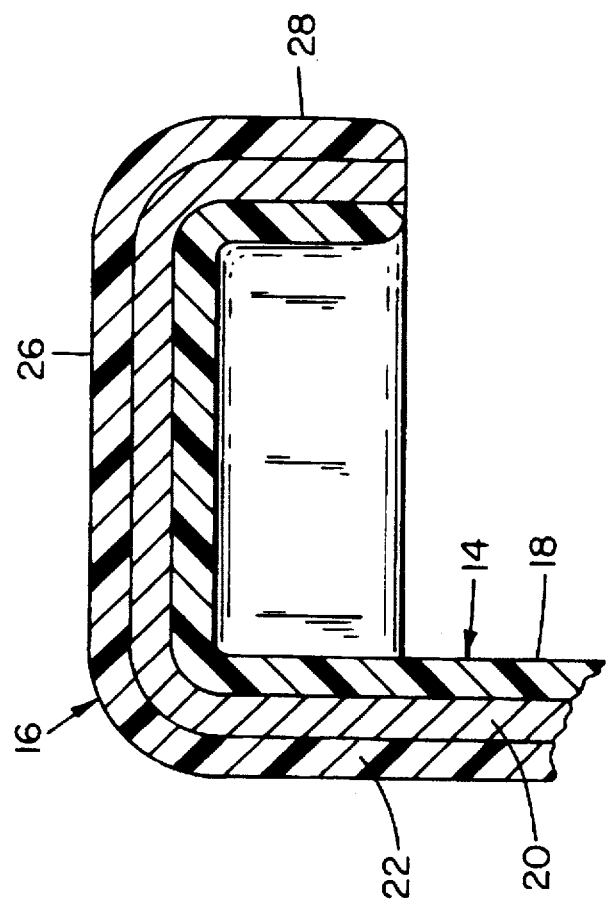
FIG. 2 is a cross-sectional view of a sidewall and flange portion of the tray of FIG. 1.

As is shown in FIG. 2, the sheet used for tray 10 preferably comprises three layers or plies 18, 20 and 22 which are preferably provided as a co-extrusion. The lower or bottom ply 18 and the upper or top ply 22 are preferably of substantially the same construction, that being a copolyester prepared from terephthalic acid, ethylene glycol and 1,4-cyclohexanedimethanol in a thickness ranging from about 3 to about 30 mils, more preferably from 10 to 25 mils.

The middle layer or ply 20 sandwiched between lower ply 18 and upper ply 22 is provided by a polymer having a thickness of from about 0.1 to about 5 mils, more preferably from 0.5 to 3 mils, which is substantially incompatible with the material of the adjacent plies. As used herein, "not compatible" or "incompatible" mean that the layers or plies would not exist in permanent association indefinitely without a tie layer or adhesive between the layers. In the present invention, no tie layer or adhesive is provided between the plies. The purpose of using a material incompatible with the other plies as the interior ply 20 is to increase the performance properties of the laminate article.

Thus, the initial sheet of plies to be formed into the article 10 may have an overall thickness ranging from about 6.1 to about 65.0 mils, more preferably from 20.5 to 53 mils. As will be appreciated, this represents a substantial thickness of material for providing solid support in targeted end use applications such as a sealable container for meats, various grocery items and medical applications requiring moderate to high barrier properties to water and oxygen transfer.

It should be understood that the article 10 may comprise more than three plies or layers provided the upper layer and lower layer are prepared from polymers which are thermally compatible. As used herein, "thermally compatible" means that when the upper layer and lower layer of the thermoformed laminate article are sealed together under conditions of sufficient elevated temperature and pressure, the layers undergo approximately equal thermal expansion or contraction and the surfaces are thermally bonded to one another.

A preferred polymer for plies 18 and 22 is a polyester derived from a dicarboxylic acid component and a diol component. As used herein, "polyester" includes polyesters prepared from more than one dicarboxylic acid and/or diol. The dicarboxylic acid component contains at least 50 mole % terephthalic acid. The diol component contains at least 50 mole % ethylene glycol based on 100 mole percent dicarboxylic acid and 100 mole percent diol. As used herein, "polyester" includes polyesters prepared from one or more dicarboxylic acids and one or more diols.

The dicarboxylic acid component of the polyester may optionally be modified with up to 50 mole percent of one or more different dicarboxylic acids other than terephthalic acid. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Specific examples of dicarboxylic acids which may be used with terephthalic acid include phthalic acid, isophthalic acid, 1,4-, 1,5-, 2,6-, and 2,7-naphthalenedicarboxylic acid, 1,3-, 1,4-cyclohexanedicarboxylic acid, cyclohexanediacetic acid, oxydibenzoic acid, 4,4-biphenyldicarboxylic acid, succinic acid, glutaric acid, adipic acid, azelaic acid, sebacic acid, suberic acid, pimelic acid, and 1,12-dodecanedioic acid. Polyesters may be prepared from one or more of the above dicarboxylic acids.

It should be understood that use of the corresponding acid anhydrides, esters, and acid chlorides of these acids is included in the term "dicarboxylic acid".

The diol component of the polyester may optionally be modified with up to 50 mole percent of one or more different diols other than ethylene glycol. The additional diols include cycloaliphatic diols having 6 to 16 carbon atoms and aliphatic diols having 3 to 16 carbon atoms. Specific examples of diols which may be used with ethylene glycol include diethylene glycol, triethylene glycol, 1,4 and 1,3-cyclohexanedimethanol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Polyesters may be prepared from one or more of the above diols.

The polyesters of the present invention can be prepared by conventional polycondensation procedures well-known in the art. Such processes include direct condensation of the dicarboxylic acid(s) with the diol(s) or by ester interchange using a dialkyl dicarboxylate. For example, dimethyl terephthalate is ester interchanged with the diols at elevated temperatures in the presence of a catalyst. Typical catalysts which may be used include titanium alkoxides such as acetyl triisopropyl titanate, tetraisopropyl titanate, and tetraisobutyl titanate; germanium; dibutyl tin dilaurate; and combinations of zinc, manganese or magnesium acetates or benzoates. Germanium and antimony may be in the form of oxides, organic salts, and glycolates such as antimony oxide or antimony triacetate. The polyester may also be subjected to solid state polymerization methods.

The polyesters have an inherent viscosity of about 0.4 to about 1.5 dl/g. Preferably, the polyesters have an inherent viscosity of 0.5 to 0.9 dL/g. It is especially preferred that the polyester be prepared from or derived from repeating units consisting of terephthalic acid, ethylene glycol and 1,4-cyclohexanedimethanol.

Many other ingredients can be added to the polyester to enhance the performance properties of the polyester. For example, antioxidants, denesting agents, antiblocking agents, metal deactivators, colorants, phosphate stabilizers, mold release agents, fillers such as talc and formica, silica, glass beads, glass fibers, nucleating agents, ultraviolet light and heat stabilizers, lubricants, flame retardants and the like, can be included herein. All of these additives and the use thereof are well known in the art. Any of these additives can be used as long as they do not deleteriously effect the physical, mechanical, or adhesive properties of the polyester.

Polymers incompatible with the polyester which may find application in the various embodiments of the invention include polymers selected from the group consisting of acrylonitrile-butadiene-styrene, polyvinyl chloride, polyamide, ethylene alcohol, vinyl alcohol, cellulose acetate, acrylic, polystyrene, semicrystalline or crystallized polyesters, urethane. Combinations of polymers may also be used. In addition, monomers used to prepare the above-named polymers may be reacted to prepare copolymers that are within the scope of the present invention. Included also are any polymers that may impact specifically needed physical properties such as polymers that are impervious to certain gases.

Acrylonitrile-butadiene-styrene resin (ABS resin) is a rigid thermoplastic resin prepared from acrylonitrile, butadiene and styrene monomers. ABS resins are graft polymers consisting of an elastomeric polybutadiene or rubber phase, grafted with styrene and acrylonitrile monomers for compatibility, dispersed in a rigid styrene-acrylonitrile matrix. ABS resins are characterized by the following properties: dimensional stability over a temperature range of –40° C. to +71° C., tensile strength of about 6500 psi, flexural strength of about 10,000 psi.

Polyvinyl chloride (PVC resin) is a thermoplastic polymer which is prepared by a free radical polymerization of vinyl chloride monomer.

Polyamide resins are thermoplastic polymers which contain an amide group —CONH. Polyamide resins are characterized by a tensile strength up to 8 g/denier (approximately 100,000 psi). Suitable polyamide resins, for example, include Nylon 66, Nylon 6, Nylon 4 and Nylon 610. Nylon 66 is a condensation product of adipic acid and hexamethylenediamine. Nylon 6 is a polymer of caprolactam. Nylon 4 is a polymer of butyrolactam (2-pyrrolidone). Nylon 610 is a condensation product of sebacic acid and hexamethylenediamine.

Cellulose acetate is a thermoplastic resin. Cellulose acetate is a cellulose ester in which the cellulose is not completely esterified by acetic acid. The cellulose ester is prepared by reacting cellulose with acetic acid or acetic anhydride.

Acrylic resin is a thermoplastic polymer or copolymer of acrylic acid, methacrylic acid, esters of acrylic acid or methacrylic acid, or acrylonitrile. Examples of acrylate esters include methyl acrylate, ethyl acrylate, butyl acrylate, hexyl acrylate, isooctyl acrylate, isodecyl acrylate, lauryl acrylate, stearyl acrylate, phenoxyethyl acrylate, methoxyethyl acrylate, benzyl acrylate, furyl acrylate, methylfuryl acrylate, butylfuryl acrylate, tetrahydrofurfuryl acrylate, ethoxyethyl acrylate, 2-ethylhexyl acrylate, cyclopentyl acrylate, cyclohexyl acrylate, isobornyl acrylate, hydroxyethyl acrylate, and hydroxypropyl acrylate.

Examples of methacrylate esters include methyl methacrylate, ethyl methacrylate, propyl methacrylate, butyl methacrylate, hexyl methacrylate, cyclohexyl methacrylate, isodocyl methacrylate, lauryl methacrylate, stearyl methacrylate, isobornyl methacrylate, phenyl methacrylate, benzyl methacrylate, propylene glycol methacrylate, tetrahydrofurfuryl methacrylate, hydroxylethyl methacrylate, and hydroxypropyl methacrylate.

Polystyrene is a thermoplastic resin prepared by polymerizing styrene monomer.

Semicrystalline or crystalline polyesters are selected from polyethylene terephthalate, bis(ethoxylated) Bisphenol A, bis(propoxylated) Bisphenol A, polyethylene oxide diol, and polypropylene oxide diol.

Combinations of monomers used for preparing the above-described resins may also be polymerized to form polymers. Preferably, the polymer is selected from the group consisting of an ethylene/vinyl alcohol copolymer, an acrylonitrile/methacrylate/butadiene terpolymer and poly(m-xylylene adipamide).

The multiple polymer plies are coextruded either by simultaneous coextrusion of the respective film-forming plies through independent orifices of a multi-orifice die, and thereafter uniting the still molten layers, or by single-channel coextrusion in which molten streams of the respective film-forming plies are first united within a channel leading to a die manifold, and thereafter extruded together from the die orifice under conditions of streamline flow without intermixing.

Lamination is conducted at a temperature and pressure sufficient to cause the layers of the laminate article to become tacky and bond to each other without causing decomposition, distortion, or other undesirable effects.

The laminating method comprises hot press bonding and cold press bonding. Hot press bonding is conducted at a temperature of 250° F. to 340° F., preferably 270° F. to 300° F., a pressure of 90 to 110 psi, preferably 90 to 100 psi, and for a period of time from about 1 to about 15 minutes, preferably 2 to 13 minutes.

Hot press bonding is followed by cold press bonding wherein the laminate sheet is held rigid at a pressure of 50 to 500 psi, preferably 200 to 300 psi while it cools to near ambient temperature. Once the laminate sheet is cooled it may be shaped and formed into a variety of useful articles by thermoforming. Illustrative articles include trays, counter tops, table tops, cabinet doors, game boards, juvenile products, toys, panels for shower stalls, hot tubs, chalkboards, indoor and outdoor signs, seamless vanity tops including sink, soap dish, and back splash.

During molding, the laminate sheet is heated thoroughly and at a temperature hot enough so that all of the layers of the laminate sheet will stretch either into the female mold or over the male mold.

Returning to the drawings now in more detail, an important aspect of the invention concerns the formation and configuration of flange 16 which contributes to the improved resistance of the article to delamination. As shown in FIG. 2, a preferred embodiment of the flange 16 upon molding the article 10 in the form shown in FIG. 1 includes a first section 26 extending out from the sidewall 14 in perpendicular relation thereto substantially parallel to pan section 12 and a second section 28 extending down from the first section 26 substantially parallel to the sidewall 14.

Figure 3:
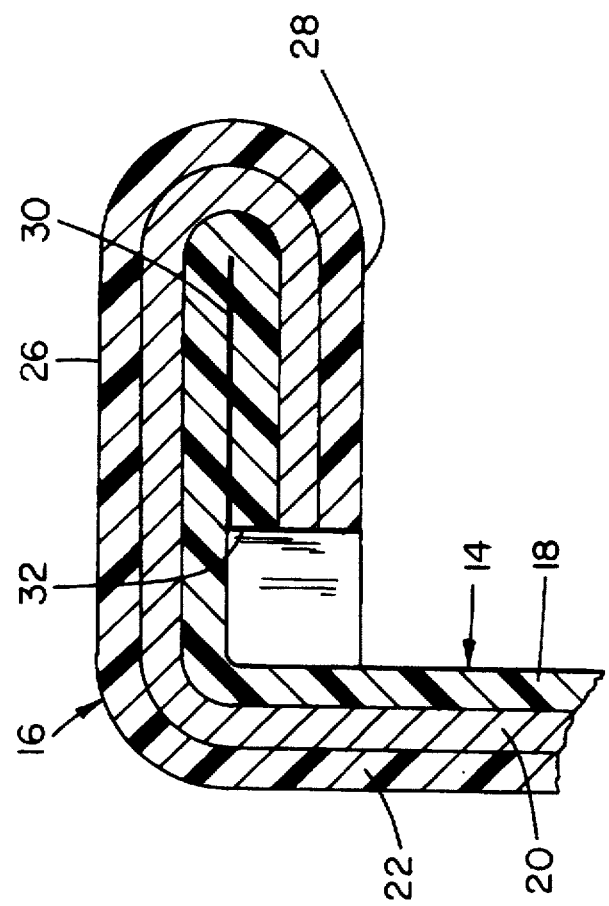
FIG. 3 is a cross-sectional view of the portion of the tray of FIG. 2 illustrating one embodiment of folded-over heat-sealed portions of the flange.

In this configuration, a heated bar sealer or other suitable sealing device is applied to deform or fold the second section 28 against the first section 26 applying sufficient pressure and heat to effect a thermal bond or seal 30 between the respective surfaces of ply 18 in interfacial contact as shown in FIG. 3. Preferably, the folding is undertaken at a location along flange 16 such that an end 32 of the second section 28 in the folded configuration is spaced from sidewall 14, but it is within the scope of the invention that end 32 may be heat sealed to or in contact with sidewall 14.

In the FIG. 2 embodiment, when section 28 is folded over and sealed to section 16, the layers are held together by the mechanical strength of layer 22, being rigidly formed and requiring much force to peel back and expose layer 20.

Figure 4:
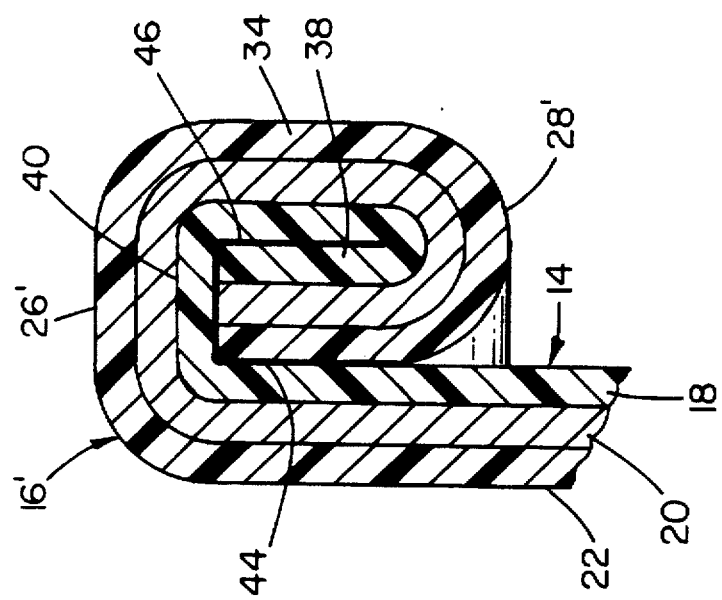
FIG. 4 is a cross-sectional view of the portion of the tray of FIG. 2 illustrating another embodiment of folded-over heat-sealed portions of the flange.

In another embodiment of flange 16' shown in FIG. 4, the second section 28' includes a first portion 34 extending down from the first section 26' and a second portion 38 extending up from the first portion into a pocket 40 provided between sidewall 14 and the first portion 34. This form of flange 16' is preferably provided by further folding of the first section 26' of the FIG. 3 embodiment so that first section 26' is shortened yielding a part of its length to the second section 28' which will then comprise the two portions 34 and 38 with the latter essentially tucked into pocket 40. Application of sufficient heat and pressure to the adjacent surfaces of plies 18 and 22 in interfacial contact effects thermal bonds or seals 44 and 46.

Figure 5:
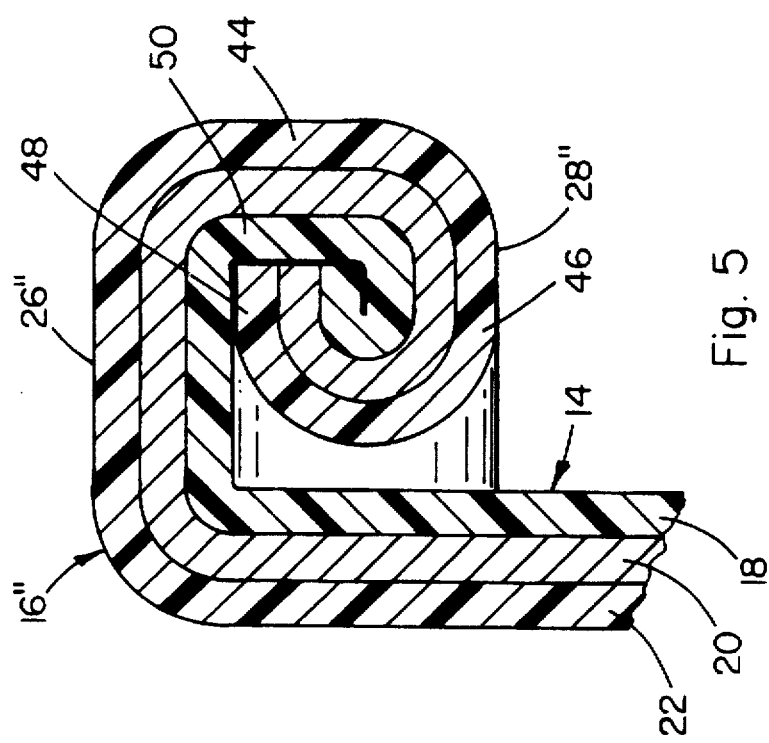
FIG. 5 is a cross-sectional view of the portion of the tray of FIG. 2 illustrating a further embodiment of folded-over heat-sealed portions of the flange.

In another embodiment of flange 16" shown in FIG. 5, the second section 28" includes a first portion 44 extending down from the first section 26", a second portion 46 substantially parallel to the first section 26", and a third portion 48 disposed in a pocket 50 provided between first section 26" and second portion 46. In this form of flange 16", the second section 28" is initially provided with a sufficient length to enable two folds to be effected therein, the first fold forming the second portion 46 extending from the first portion 44 and the second fold forming the third portion 48 extending from the second portion 46. Preferably, the fold between the second and third portions 46 and 48, folding the former against the latter, is effected first followed by the fold between the first and second portions 44 and 46 disposing the third portion 48 within pocket 50 as shown. Application of sufficient heat and pressure to the surfaces of the respective plies in interfacial contact effects a thermal bond or seal to limit delamination of the materials.

The following nonlimiting examples illustrate further aspects of the invention. The materials and testing procedures used for the results shown herein are as follows:

Melt Flow Index: ASTM-D1238

Inherent Viscosity (I.V.) was measured at 25° C. using 0.50 grams of polymer or polyester per 100 ml of a solvent consisting of 60% by weight phenol and 40% by weight tetrachloroethane. Inherent viscosity is reported in dL/g.

EXAMPLE 1

A 13.5 mm laminate sheet was coextruded having a 6.5 mm outer layer and a 6.5 mm backing layer which were prepared from a polyester and a 0.5 mm layer of polymer between the outer layer and backing layer. The polyester contained repeat units from terephthalic acid, and 69 mole % ethylene glycol and 31 mole % 1,4-cyclohexanedimethanol and had an inherent viscosity of 0.75 dL/g. The polymer was a ethylene/vinyl alcohol copolymer having an ethylene content of 32 mole % and a melt flow index of 3 g/10 min. at 410° F. and 4.76 lb load.

The multiple polymer plies were heated to about 300° F. and vacuum formed to form a tray 10 as shown in FIG. 1 having a length of 3.5 inches, a width of 6 inches and a height of 1.5 inches. The tray 10 had a flange 16 having a first section 26 having a length of 0.75 inches extending out from the sidewall 14 in perpendicular relation thereto substantially parallel to the pan section 12 and a second section 28 having a length of 0.25 inches extending down from the first section 26 substantially parallel to the sidewall 14.

The second section 28 of the flange 16 was folded under the first section 26 such that the second section 28 was parallel and in contact with the first section 26. The second section 28 was heat sealed to the first section using a bar sealer at 300° F. for 5 seconds at 60 psi.

The multiple plies of the laminate tray could not be delaminated at the flange without destroying the tray.

EXAMPLE 2

A 20.5 mm laminate sheet was coextruded having a 10.0 mm outer layer and a 10.0 mm backing layer which were prepared from a polyester and a 0.5 mm layer of polymer between the outer layer and backing layer. The polyester contained repeat units from terephthalic acid, and 96.5 mole % ethylene glycol and 3.5 mole % 1,4-cyclohexanedimethanol and had an inherent viscosity of 0.74 dL/g. The polymer consisted of 70 weight percent acrylonitrile, 20 weight percent methylacrylate and 10 weight percent butadiene having a melt flow index of 3 g/10 min. at 410° F. and 4.76 lb load.

The multiple polymer plies were heated to about 300° F. and vacuum formed to form a tray 10 as shown in FIG. 1 having a length of 3.5 inches, a width of 6 inches and a height of 1.5 inches. The tray 10 had a flange 16 having a first section 26 having a length of 0.75 inches extending out from the sidewall 14 in perpendicular relation thereto substantially parallel to the pan section 12 and a second section 28 having a length of 0.25 inches extending down from the first section 26 substantially parallel to the sidewall 14.

The second section 28 of the flange 16 was folded under the first section 26 such that the second section was parallel and in contact with the first section. The second section 28 was heat sealed to the first section 26 using a bar sealer at 300° F. for 5 seconds at 60 psi.

The multiple plies of the laminate tray 10 could not be delaminated at the flange 16 without destroying the tray.

EXAMPLE 3

A 15.0 mm laminate sheet was coextruded having a 7.0 mm outer layer and a 7.0 mm backing layer of a polyester and a 1.0 mm layer of polymer between the outer layer and backing layer. The polyester contained repeat units from terephthalic acid and 1,4-cyclohexanedimethanol and had an inherent viscosity of 0.95 dL/g. The polymer was a poly(m-xylene adipamide).

The multiple polymer plies were heated to about 300° F. and vacuum formed to form a tray 10 as shown in FIG. 1 having a length of 3.5 inches, a width of 6 inches and a height of 1.5 inches. The tray 10 had a flange 16 initially configured as shown in FIG. 2 having a first section 26 having a length of 0.75 inches extending out from the sidewall 14 in perpendicular relation thereto substantially parallel to the pan section 12 and a second section 28 having a length of 0.25 inches extending down from the first section 26 substantially parallel to the sidewall 14.

A flange 16' as shown in FIG. 4 was produced by folding the second section 28 under the first section 26 as shown in FIG. 3 such that the second section 28 was parallel and in contact with the first section 26. The second section 28 was heat sealed to the first section 26 using a bar sealer at 300° F. for 5 seconds at 60 psi.

The first section 26 was folded providing a first portion 34 and a second portion 38 of the second section 28' such that the second portion 38 was parallel and in contact with the sidewall 14. The second section 28' was heat sealed to the first section 26' and sidewall 14 using a bar sealer at 300° F. for 5 seconds at 60 psi.

The multiple plies of the laminate tray 10 could not be delaminated at the flange 16 without destroying the tray.

EXAMPLE 4

A 15.0 mm laminate sheet was coextruded having a 7.25 mm outer layer and a 7.25 mm backing layer which were prepared from a polyester and a 0.5 mm layer of polymer between the outer layer and backing layer. The polyester contained repeat units from terephthalic acid and ethylene glycol and had an inherent viscosity of 0.74 dL/g. The polymer was a ethylene/vinyl alcohol copolymer having an ethylene content of 32 mole % and a melt flow index of 3 g/10 min. at 410° F. and 4.76 lb load.

The multiple polymer plies were heated to about 300° F. and vacuum formed to form a tray 10 as shown in FIG. 1 having a length of 3.5 inches, a width of 6 inches and a height of 1.5 inches. The tray 10 had a flange 16 having a first section 26 having a length of 0.75 inches extending out from the sidewall 14 in perpendicular relation thereto substantially parallel to the pan section 12 and a second section 28 having a length of 0.25 inches extending down from the first section 26 substantially parallel to the sidewall 14.

The second section 28 of the flange 16 was folded under the first section 26 such that the second section 28 was parallel and in contact with the first section 26. The second section 28 was heat sealed to the first section 26 using a bar sealer at 300° F. for 5 seconds at 60 psi.

The multiple plies of the laminate tray 10 could not be delaminated at the flange 16 without destroying the tray.

While the invention has been described with particular reference to certain embodiments thereof, it will be understood that changes and modifications may be made which are within the skill of the art. The present invention is limited only by the claims that follow.

What is claimed is:

1. A laminate article which comprises a continuous multi-ply construction of two or more superposed incompatible polymeric plies laminated together in the absence of a tie layer having a central relatively wide and flat pan section, an upstanding side wall extending therefrom and a flange on the sidewall, the flange having a first section extending from the sidewall and a second section extending from the first section at least a portion of the second section is folded against the first section and heat sealed thereto.

2. The laminate article of claim 1 wherein the first section is substantially parallel to the pan section.

3. The laminate article of claim 1 wherein the second section of the flange includes a first and second portion with the second portion being folded against the first portion and heat sealed to the sidewall.

4. The laminate article of claim 3 wherein the first portion extends from the first section of the flange to provide a pocket between the sidewall and the first portion and the second portion is disposed in the pocket.

5. The laminate article of claim 4 wherein the second portion is sandwiched in the pocket between the first portion of the second section of the flange and the sidewall and heat sealed to the sidewall and first portion.

6. The laminate article of claim 5 wherein the second portion of the second section of the flange has an end terminating the flange.

7. The laminate article of claim 6 wherein the end terminating the flange is heat sealed to the first section of the flange so that the second portion substantially fills the pocket and is substantially completely heat sealed therein to all adjacent surfaces.

8. The laminate article of claim 1 wherein the second section of the flange includes first, second and third portions, the first portion extending from the first section of the flange, the second portion extending from first portion substantially perpendicular to the first section of the flange in spaced-apart relation thereto defining a pocket therebetween and the third portion extending from the second portion into the pocket and being folded against the second portion and heat sealed to the first section of the flange.

9. The laminate article of claim 8 wherein the second and third portions of the second section of the flange are spaced from the sidewall so as to define a second pocket located between the sidewall and the second section of the flange closed on the bottom by the first section of the flange.

10. The laminate article of claim 1 wherein the first section has a length of 0.75 inches and the second section has a length of 0.25 inches.

11. The laminate article of claim 1 wherein the polymeric plies comprise a polyester outer layer, a polyester backing layer and a polymer layer between the outer layer and backing layer.

12. The laminate article of claim 11 wherein the polyester has an inherent viscosity of about 0.4 to about 1.5 dl/g.

13. The laminate article of claim 12 wherein the polyester has an inherent viscosity of 0.5 to 0.9 dl/g.

14. The laminate article of claim 11 wherein the polyester comprises repeat units from terephthalic acid, ethylene glycol and 1,4-cyclohexanedimethanol.

15. The laminate article of claim 11 wherein the polyester comprises repeat units from terephthalic acid and ethylene glycol.

16. The laminate article of claim 11 wherein the polyester comprises repeat units from terephthalic acid and 1,4-cyclohexanedimethanol.

17. The laminate article of claim 11 wherein the polymer is selected from the group consisting of acrylonitrile-butadiene-styrene, polyvinyl chloride, polyamide, cellulose acetate, acrylic, polystyrene, semicrystalline or crystallized polyesters, urethane, and combinations thereof.

18. The laminate article of claim 17 wherein the polymer is a copolymer of ethylene and vinyl alcohol.

19. The laminate article of claim 17 wherein the polymer is a terpolymer of acrylonitrile, methylacrylate and butadiene.

20. The laminate article of claim 17 wherein the polymer is poly(m-xylene adipamide).

21. A laminate article which comprises a continuous multi-ply construction of two or more superposed incompatible polymeric plies laminated together in the absence of a tie layer having a central relatively wide and flat pan section, an upstanding side wall extending therefrom and a flange on the sidewall, the flange having a first section extending from the sidewall and a second section extending from the first section at least a portion of the first section is folded against the sidewall and heat sealed thereto.

22. A method for making a laminate article comprising:

I. coextruding a laminate sheet having multiple plies of substantially continuous incompatible polymers without a tie layer therebetween;

II. molding the laminate sheet at a temperature and pressure sufficient to form the sheet into an article having a relatively wide, flat pan section, an upstanding sidewall extending from the pan section and a flange extending from the sidewall, the flange having a first section extending from the sidewall and a second section extending from the first section; and III. folding at least a portion of the second section of the flange against the first section of the flange under sufficient heat and pressure to cause the second section to heat seal with the first section of the flange.

23. A method for making a laminate article comprising:

I. coextruding a laminate sheet having multiple plies of substantially continuous incompatible polymers without a tie layer therebetween;

II. molding the laminate sheet at a temperature and pressure sufficient to form the sheet into an article having a relatively wide, flat pan section, an upstanding sidewall extending from the pan section and a flange extending from the sidewall, the flange having a first section extending from the sidewall and a second section extending from the first section; and III. folding at least a portion of the second section of the flange against the sidewall under sufficient heat and pressure to cause the second section to heat seal with the sidewall.

24. The method of claim 22 wherein sealing is accomplished by a process selected from the group consisting of heat sealing, solvent weld, radio frequency weld, ultrasonic weld and adhesive bond.

25. The method of claim 24 wherein the heat sealing is accomplished by a bar sealer.

* * * * *